United States Patent
Sohn et al.

(10) Patent No.: US 10,266,614 B2
(45) Date of Patent: Apr. 23, 2019

(54) MODIFIED CONJUGATED DIENE POLYMER, MODIFIED RUBBER COMPOSITION COMPRISING SAME, AND METHOD FOR PREPARING MODIFIED CONJUGATED DIENE POLYMER

(71) Applicant: LG Chem, Ltd., Seoul (KR)

(72) Inventors: Hae-Sung Sohn, Daejeon (KR); No-Ma Kim, Daejeon (KR); He-Seung Lee, Daejeon (KR)

(73) Assignee: LG Chem, Ltd. (KR)

( * ) Notice: Subject to any disclaimer, the term of this patent is extended or adjusted under 35 U.S.C. 154(b) by 246 days.

(21) Appl. No.: 15/125,798

(22) PCT Filed: Oct. 14, 2015

(86) PCT No.: PCT/KR2015/010864
§ 371 (c)(1),
(2) Date: Sep. 13, 2016

(87) PCT Pub. No.: WO2016/111445
PCT Pub. Date: Jul. 14, 2016

(65) Prior Publication Data
US 2017/0002103 A1   Jan. 5, 2017

(30) Foreign Application Priority Data

Jan. 5, 2015 (KR) .......... 10-2015-0000688
Oct. 6, 2015 (KR) .......... 10-2015-0140485

(51) Int. Cl.
| | | |
|---|---|---|
| C08C 19/44 | (2006.01) |
| C08C 19/25 | (2006.01) |
| B60C 1/00 | (2006.01) |
| C08F 236/10 | (2006.01) |
| C08K 3/04 | (2006.01) |
| C08K 3/36 | (2006.01) |
| C08L 15/00 | (2006.01) |
| C08F 297/04 | (2006.01) |
| C08L 53/02 | (2006.01) |

(52) U.S. Cl.
CPC ........... *C08C 19/44* (2013.01); *B60C 1/00* (2013.01); *B60C 1/0016* (2013.01); *C08C 19/25* (2013.01); *C08F 236/10* (2013.01); *C08F 297/044* (2013.01); *C08K 3/04* (2013.01); *C08K 3/36* (2013.01); *C08L 15/00* (2013.01); *C08L 53/02* (2013.01)

(58) Field of Classification Search
CPC ................ C08C 19/25; C08C 19/44
USPC ......................................... 556/485
See application file for complete search history.

(56) References Cited

U.S. PATENT DOCUMENTS

| 3,694,480 A | 9/1972 | Omietanski |
|---|---|---|
| 2004/0072674 A1 | 4/2004 | Ozin et al. |
| 2004/0152845 A1 | 8/2004 | Oshima et al. |
| 2009/0239974 A1 | 9/2009 | Mori et al. |
| 2010/0317885 A1* | 12/2010 | Dinh .................. C07F 7/14 556/484 |
| 2013/0245192 A1 | 9/2013 | Tanaka et al. |
| 2015/0126643 A1 | 5/2015 | Satou et al. |
| 2016/0053059 A1 | 2/2016 | Kim et al. |

FOREIGN PATENT DOCUMENTS

| CN | 103237833 A | 8/2013 |
|---|---|---|
| EP | 2647657 A1 | 10/2013 |
| JP | S63301204 A | 12/1988 |
| JP | 2014055264 A | 3/2014 |
| JP | 2014108922 A | 6/2014 |
| JP | 2014162845 A | 9/2014 |
| JP | 2015520789 A | 7/2015 |
| JP | 2016014122 A | 1/2016 |
| JP | 2016017097 A | 2/2016 |
| KR | 20040070047 A | 8/2004 |
| KR | 20060012403 A | 2/2006 |
| KR | 20070117626 A | 12/2007 |
| KR | 20140120380 A | 10/2014 |

OTHER PUBLICATIONS

Voronokov, M.G., et al., Izvestiya Akademil Nauk SSSR, Seriya Khimicheskaya, Sep. 30, 1983, pp. 1893-1894.
International Search Report from PCT/KR2015/010864, dated Jan. 28, 2016.
Voronkov, M.G., et al., Izvestiya Akademii Nauk SSSR, Seriya, Khimicheskaya, 1983, vol. 87, 1983-4 (see abstract).
Extended European Search Report for Application No. 15877165.9, dated Apr. 3, 2017.
M. G. Voronkov et al., Bromination of si-alkyl(methoxy)-substituted 1, 2-disilylethylene derivatives, Plenum Publishing Corporation, Dec. 31, 1984, p. 1893-1894.

\* cited by examiner

*Primary Examiner* — Vickey Nerangis
(74) *Attorney, Agent, or Firm* — Lerner, David, Littenberg, Krumholz & Mentlik, LLP

(57) ABSTRACT

Disclosed are a modified conjugated diene-based polymer represented by Chemical Formula 2a or 2b defined herein and a method of preparing the same.

9 Claims, No Drawings

MODIFIED CONJUGATED DIENE POLYMER, MODIFIED RUBBER COMPOSITION COMPRISING SAME, AND METHOD FOR PREPARING MODIFIED CONJUGATED DIENE POLYMER

CROSS-REFERENCE TO RELATED APPLICATION

This application is a national phase entry under 35 U.S.C. § 371 of International Application No. PCT/KR2015/010864, filed Oct. 14, 2015, which claims priority to Korean Patent Application No. 10-2015-0000688, filed Jan. 5, 2015 and Korean Patent Application No. 10-2015-0140485, filed Oct. 6, 2015, the disclosures of which are incorporated herein by reference.

TECHNICAL FIELD

The present invention relates to a method of preparing a modified conjugated diene-based polymer and, more particularly, to a method of preparing a modified conjugated diene-based polymer having superior tensile strength, wear resistance, and wet skid resistance, as well as low rolling resistance, a modified conjugated diene-based polymer prepared by the method, and a rubber composition comprising the modified conjugated diene-based polymer.

BACKGROUND ART

Recently, in the vehicle industry, the demand for the durability, stability and fuel economy of vehicles is continuously increasing, and much effort is directed to satisfying the demand.

In particular, many attempts have been made to improve the properties of rubber, as a material for vehicle tires, especially tire treads, which are in contact with roads. The rubber composition for a vehicle tire contains a conjugated diene-based polymer, such as polybutadiene or butadiene-styrene copolymer.

Thorough research is currently ongoing into the addition of various reinforcing agents to conjugated diene-based rubber compositions to increase the performance of vehicle tires. Specifically, as vehicles are required to exhibit stability, durability and fuel economy, rubber having high wet skid resistance and mechanical strength and low rolling resistance is being developed as a material for vehicle tires, especially tire treads, which are in contact with roads.

In this regard, modified polymers having high resilience and thus superior fuel economy are under study, as disclosed in Korean Patent Application Publication No. 2006-0012403, but the effects thereof are still not satisfactory.

DISCLOSURE

Technical Problem

Accordingly, the present invention has been made keeping in mind the above problems encountered in the related art, and an object of the present invention is to provide a modified conjugated diene-based polymer having superior tensile strength, wear resistance and wet skid resistance, as well as low rolling resistance, and a method of preparing the same.

Technical Solution

In order to accomplish the above object, the present invention provides a modified conjugated diene-based polymer represented by Chemical Formula 2 below:

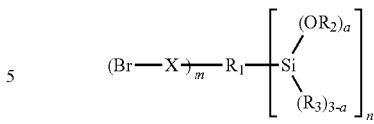

[Chemical Formula 2]

wherein $R_1$ is a C1-C20 alkylene group and may be substituted with an amine group or an ether group, and $R_2$ and $R_3$ are a C1-C10 alkyl group, an amine group or an acryl group; P is (Y—X), in which X is a single bond or $P_2$, and Y is Br or $P_3$; $P_2$ is a conjugated diene-based polymer or an acrylic or nitrile compound, with a molecular weight of 10 to 100,000 g/mol, and $P_1$ and $P_3$ are a conjugated diene-based polymer or an acrylic or nitrile compound, with a molecular weight of 10,000 to 2,000,000 g/mol; and a and b are each independently 0, 1, 2, or 3, a+b is 1, 2 or 3, m is an integer of 2 to 4, and n is an integer of 1 to 3.

In addition, the present invention provides a method of preparing a modified conjugated diene-based polymer, comprising: a) polymerizing a conjugated diene monomer or a conjugated diene monomer and an aromatic vinyl monomer using a hydrocarbon solvent in the presence of an organo-alkali metal compound, thus forming an active polymer having an alkali metal end; and b) coupling or linking the active polymer having the alkali metal end with a compound represented by Chemical Formula 1 below:

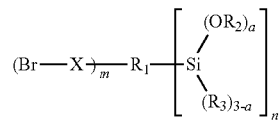

[Chemical Formula 1]

wherein $R_1$ is a C1-C20 alkylene group and may be substituted with an amine group or an ether group, and $R_2$ and $R_3$ are a C1-C10 alkyl group, an amine group or an acryl group; X is a single bond or $P_1$, and $P_1$ is a conjugated diene-based polymer, or an acrylic or nitrile compound, with a molecular weight of 10 to 100,000 g/mol; and a is 0, 1, 2, or 3, m is an integer of 2 to 4, and n is an integer of 1 to 3.

In addition, the present invention provides a modified conjugated diene-based polymer rubber composition, comprising the modified conjugated diene-based polymer prepared by the above method.

In addition, the present invention provides a tire including the modified conjugated diene-based polymer rubber composition.

Advantageous Effects

According to the present invention, a modified conjugated diene-based polymer having superior tensile strength, wear resistance and wet skid resistance, as well as low rolling resistance, can be prepared, and can be utilized to produce a rubber composition for a tire.

BEST MODE

Hereinafter, a detailed description will be given of the present invention.

The present invention addresses a modified conjugated diene-based polymer represented by Chemical Formula 2 below:

[Chemical Formula 2]

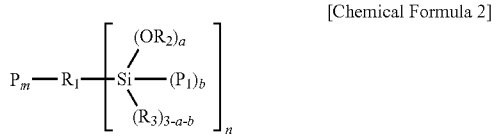

wherein $R_1$ is a C1-C20 alkylene group and may be substituted with an amine group or an ether group, and $R_2$ and $R_3$ are a C1-C10 alkyl group, an amine group or an acryl group; P is (Y—X), in which X is a single bond or $P_2$, and Y is Br or $P_3$; $P_2$ is a conjugated diene-based polymer or an acrylic or nitrile compound, with a molecular weight of 10 to 100,000 g/mol, and $P_1$ and $P_3$ are a conjugated diene-based polymer or an acrylic or nitrile compound, with a molecular weight of 10,000 to 2,000,000 g/mol; and a and b are each independently 0, 1, 2, or 3, a+b is 1, 2, or 3, m is an integer of 2 to 4, and n is an integer of 1 to 3.

Preferably, the compound represented by Chemical Formula 2 is the polymer represented by Chemical Formula 2a or Chemical Formula 2b below:

wherein b1 to b12, which are identical to or different from each other, range from 10 to 20,000.

The compound represented by Chemical Formula 2 may comprise a polymer of Chemical Formula 2a, Chemical Formula 2b, or Chemical Formula 2b in which at least one siloxane moiety is substituted with a polymer.

The compound represented by Chemical Formula 2 is a conjugated diene-based polymer using the compound represented by Chemical Formula 1 below, in which the bromine end group and some of siloxane groups may be linked with the end of the conjugated diene-based polymer.

In addition, the present invention addresses a method of preparing a modified conjugated diene-based polymer, comprising: a) polymerizing a conjugated diene monomer or a conjugated diene monomer and an aromatic vinyl monomer using a hydrocarbon solvent in the presence of an organoalkali metal compound, thus forming an active polymer having an alkali metal end; and b) coupling or linking the active polymer having the alkali metal end with a compound represented by Chemical Formula 1 below:

[Chemical Formula 2a]

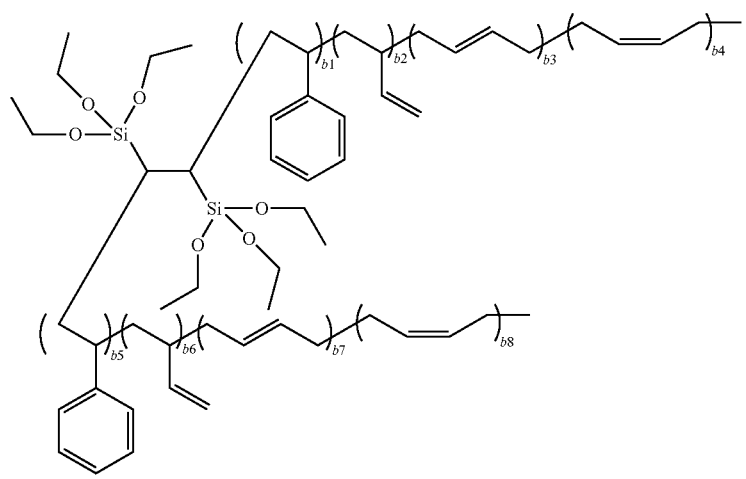

[Chemical Formula 2b]

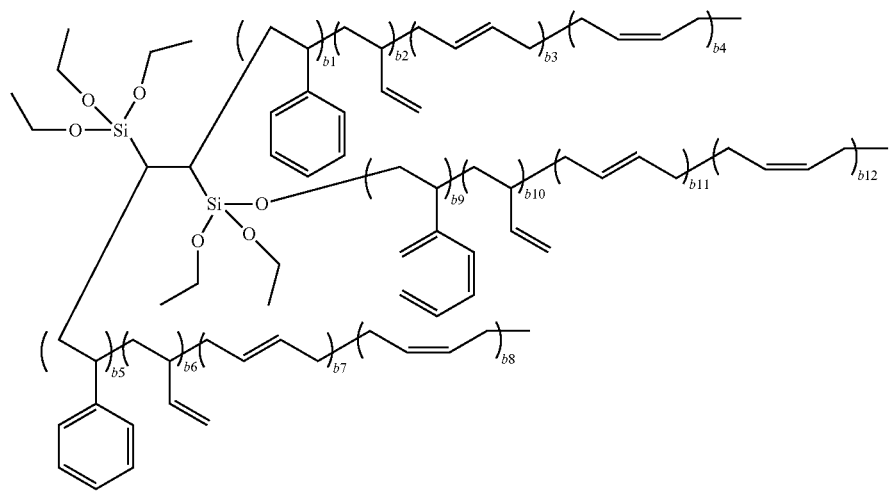

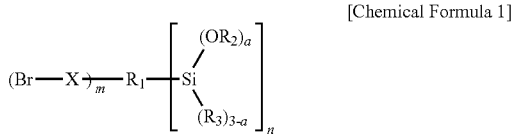

[Chemical Formula 1]

wherein $R_1$ is a C1-C20 alkylene group and may be substituted with an amine group or an ether group, and $R_2$ and $R_3$ are a C1-C10 alkyl group, an amine group or an acryl group; X is a single bond or $P_1$, and $P_1$ is a conjugated diene-based polymer or an acrylic or nitrile compound, with a molecular weight of 10 to 100,000 g/mol; and a is 0, 1, 2, or 3, m is an integer of 2 to 4, and n is an integer of 1 to 3.

The organo-alkali metal compound is preferably an organolithium compound as an anionic polymerization initiator.

The organolithium compound may include at least one selected from the group consisting of methyllithium, ethyllithium, isopropyllithium, n-butyllithium, sec-butyllithium, tert-butyllithium, n-decyllithium, tert-octyllithium, phenyllithium, 1-naphthyllithium, n-eicosyllithium, 4-butylphenyllithium, 4-tolyllithium, cyclohexyllithium, 3,5-di-n-heptyl-cyclohexyllithium, and 4-cyclopentyllithium.

The organo-alkali metal compound may be used in an amount of 0.01 to 10 mmol, 0.05 to 5 mmol, 0.3 to 5 mmol, 0.1 to 2 mmol, or 0.15 to 0.8 mmol, based on 100 g in total of the monomer.

The molar ratio of the organo-alkali metal compound and the compound represented by Chemical Formula 1 or the polymer may range from 1:0.1 to 1:10, or 1:0.5 to 1:2.

In the present invention, the conjugated diene monomer may include, but is not necessarily limited to, at least one selected from the group consisting of 1,3-butadiene, 2,3-dimethyl-1,3-butadiene, piperylene, 3-butyl-1,3-octadiene, isoprene, and 2-phenyl-1,3-butadiene.

The conjugated diene monomer may be used in an amount of 60 to 100 wt %, preferably 60 to 85 wt %, and more preferably 60 to 80 wt %, based on 100 wt % in total of the conjugated diene monomer and the aromatic vinyl monomer. When the amount of the conjugated diene monomer is 100 wt % based on 100 wt % in total of the conjugated diene monomer and the aromatic vinyl monomer, the polymerization may be carried out using the conjugated diene monomer alone, without the aromatic vinyl monomer, thus forming the active polymer.

In the present invention, the aromatic vinyl monomer may include at least one selected from the group consisting of styrene, α-methylstyrene, 3-methylstyrene, 4-methylstyrene, 4-propylstyrene, 1-vinylnaphthalene, 4-cyclohexylstyrene, 4-(p-methylphenyl)styrene, and 1-vinyl-5-hexylnaphthalene. Preferably useful is styrene or α-methylstyrene.

The aromatic vinyl monomer may be used in an amount of 0 to 40 wt %, preferably 15 to 40 wt %, and more preferably 20 to 40 wt %, based on 100 wt % in total of the conjugated diene monomer and the aromatic vinyl monomer. When the amount of the aromatic vinyl monomer is 0 wt % based on 100 wt % in total of the conjugated diene monomer and the aromatic vinyl monomer, the polymerization may be carried out using the conjugated diene monomer alone, without the aromatic vinyl monomer, thus forming the active polymer.

The hydrocarbon solvent may be exemplified by a hydrocarbon, or may include, but is not necessarily limited to, at least one selected from the group consisting of n-pentane, n-hexane, n-heptane, isooctane, cyclohexane, toluene, benzene, and xylene.

In a), the polymerization may be exemplified by anionic polymerization.

Specifically, the polymerization in a) may be living anionic polymerization in which an active end is obtained through a growth reaction involving anions.

Also, the polymerization in a) may be either high-temperature polymerization or room-temperature polymerization.

High-temperature polymerization is a polymerization process that comprises adding the organometallic compound and then applying heat to increase the reaction temperature, and room-temperature polymerization is a polymerization process that takes place in such a way that heat is not applied after the organometallic compound is added.

The polymerization in a) may take place at a temperature ranging from −20 to 200° C., preferably 0 to 150° C., and more preferably 10 to 120° C.

As used herein, the active polymer having an alkali metal end refers to a polymer comprising a polymer anion and an alkali metal cation, which are coupled with each other.

In the method of preparing the modified conjugated diene-based polymer according to the present invention, the polymerizing in a) may be performed with the additional use of a polar additive.

The polar additive may be a base, or may include ether, amine or mixtures thereof. Specifically, it may be selected from the group consisting of tetrahydrofuran, ditetrahydrofurylpropane, diethylether, cycloamylether, dipropylether, ethylenedimethylether, ethylenedimethylether, diethyleneglycol, dimethylether, tert-butoxyethoxyethane bis(2-dimethylaminoethyl)ether, (dimethylaminoethyl)ethylether, trimethylamine, triethylamine, tripropylamine, and tetramethylethylenediamine. Preferably useful is ditetrahydropropylpropane, triethylamine, or tetramethylethylenediamine.

The polar additive may be used in an amount of 0.001 to 50 g, preferably 0.001 to 10 g, and more preferably 0.005 to 1 g, based on 100 g in total of the added monomer.

The polar additive may be used in an amount of 0.001 to 10 g, preferably 0.005 to 1 g, and more preferably 0.005 to 0.1 g, based on 1 mmol in total of the added organo-alkali metal compound.

When the conjugated diene monomer and the aromatic vinyl monomer are copolymerized, it is easy to prepare a block copolymer due to the difference in the reaction rates therebetween. However, when the polar additive is added, the low reaction rate of the aromatic vinyl monomer may be increased to thus obtain the microstructure of the corresponding copolymer, for example, a random copolymer.

In b), the active polymer having the alkali metal end of a) is coupled or linked with the compound represented by Chemical Formula 1 below:

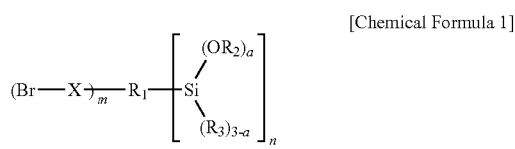

[Chemical Formula 1]

wherein $R_1$ is a C1-C20 alkylene group and may be substituted with an amine group or an ether group, and $R_2$ and $R_3$ are a C1-C10 alkyl group, an amine group or an acryl group; X is a single bond or $P_1$, and $P_1$ is a conjugated diene-based polymer or an acrylic or nitrile compound, with a molecular weight of 10 to 100,000 g/mol; and a is 0, 1, 2, or 3, m is an integer of 2 to 4, and n is an integer of 1 to 3.

The compound represented by Chemical Formula 1 is a compound including at least two bromine end groups and at least one siloxane group, in which the siloxane group includes one or more alkoxy groups.

Furthermore, $R_2$ and $R_3$ may be a C1-C10 alkyl group, an amine group, or an acryl group, but are not limited thereto, so long as they are not a reactive group that causes dehydrogenation.

Preferably, the compound represented by Chemical Formula 1 is the compound represented by Chemical Formula 1a below.

[Chemical Formula 1a]

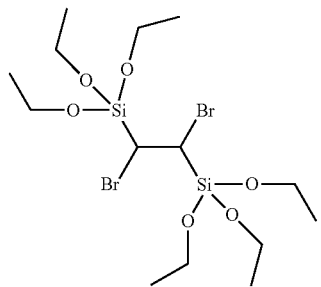

Preferably, the compound represented by Chemical Formula 1 is the compound represented by Chemical Formula 1b below:

In Chemical Formula 1, $P_1$ may be a conjugated diene-based polymer or an acrylic or nitrile compound, but is not limited thereto so long as it does not cause dehydrogenation.

In Chemical Formula 1, $P_1$ preferably has a molecular weight of 10 to 100,000 g/mol in order to exhibit solubility in a solvent such as n-hexane and miscibility with the polymerization solution.

Also, b) is performed at 0 to 90° C. for 1 min to 5 hr.

The method of preparing the modified conjugated diene-based polymer according to the present invention may be carried out in a batch manner, or alternatively in a continuous manner using a single reactor or two or more reactors.

In addition, the present invention addresses a modified conjugated diene-based polymer prepared by the above method.

The modified conjugated diene-based polymer may be a chain composed exclusively of a conjugated diene monomer or composed of a conjugated diene monomer and an aromatic vinyl monomer.

The chain composed of a conjugated diene monomer and an aromatic vinyl monomer may be a polymer chain comprising 0.0001 to 40 wt %, preferably 10 to 35 wt %, and more preferably 20 to 30 wt % of the aromatic vinyl monomer, based on 100 wt % in total of the conjugated diene monomer and the aromatic vinyl monomer.

The polymer chain comprising the conjugated diene monomer and the aromatic vinyl monomer may be, for example, a random polymer chain.

The modified conjugated diene-based polymer may have a Mooney viscosity of 40 or more, preferably from 40 to 90, and more preferably from 50 to 80.

[Chemical Formula 1b]

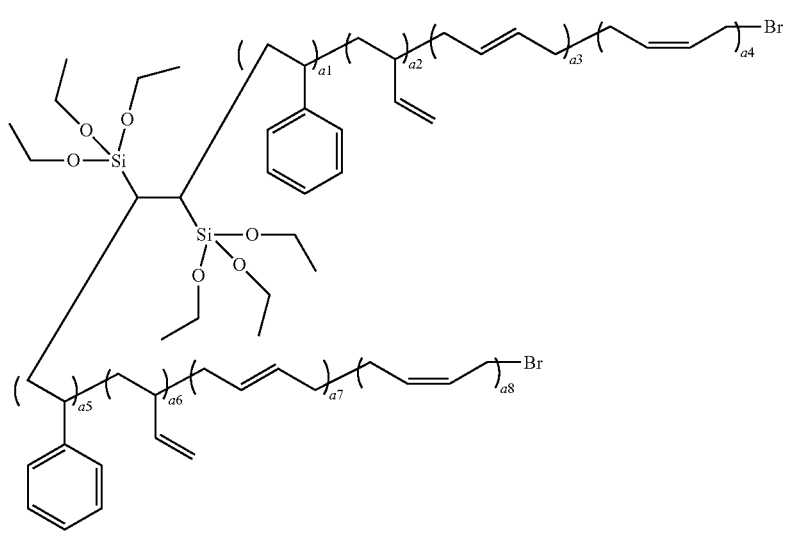

wherein a1 to a8, which are identical to or different from each other, range from 0 to 200.

The compound represented by Chemical Formula 1 is used in an amount of 0.01 to 10 mmol, preferably 0.05 to 5 mmol, and more preferably 0.1 to 2 mmol, based on 100 g in total of the monomer.

In b), prepared is a modified conjugated diene-based polymer in which the compound represented by Chemical Formula 1 is attached to the end of the chain of the active polymer having the alkali metal end.

The modified conjugated diene-based polymer may have a number average molecular weight of 1,000 to 2,000,000 g/mol, preferably 10,000 to 1,000,000 g/mol, and more preferably 100,000 to 500,000 g/mol.

The modified conjugated diene-based polymer has a vinyl content of 18 wt % or more, preferably 25 wt % or more, and more preferably 30 to 70 wt %. When the vinyl content thereof falls in the above range, the glass transition temperature of the polymer may be elevated. Thus, when such a polymer is applied to tires, the properties required of tires, such as running resistance and braking force, may be satisfied, and superior fuel economy may result.

The vinyl content refers to the amount of a monomer having a vinyl group, or the amount not of 1,4-added conjugated diene monomer but of 1,2-added conjugated diene monomer, based on 100 wt % of the conjugated diene monomer.

The modified conjugated diene-based polymer has a polydispersity index (PDI) of 1 to 10, preferably 1 to 5, and more preferably 1.0 to 2.0.

The modified conjugated diene-based polymer may exhibit viscoelastic properties. When measured at 10 Hz using DMA after mixing with silica, Tan δ at 0° C. may be in the range of 0.6 to 1.2 or 0.9 to 1.2. Given the above Tan δ range, desired skid resistance or wet resistance may be obtained.

Also, Tan δ at 60° C. may be in the range of 0.09 to 0.14 or 0.1 to 0.12. Given the above Tan δ range, desired rolling resistance or rotational resistance (RR) may be obtained.

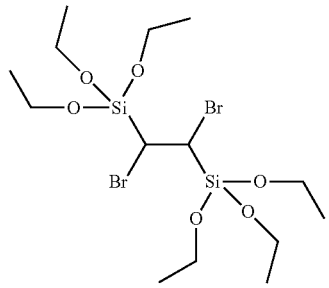

[Chemical Formula 1a]

Also, the compound represented by Chemical Formula 1 may be, for example, the compound represented by Chemical Formula 1b below:

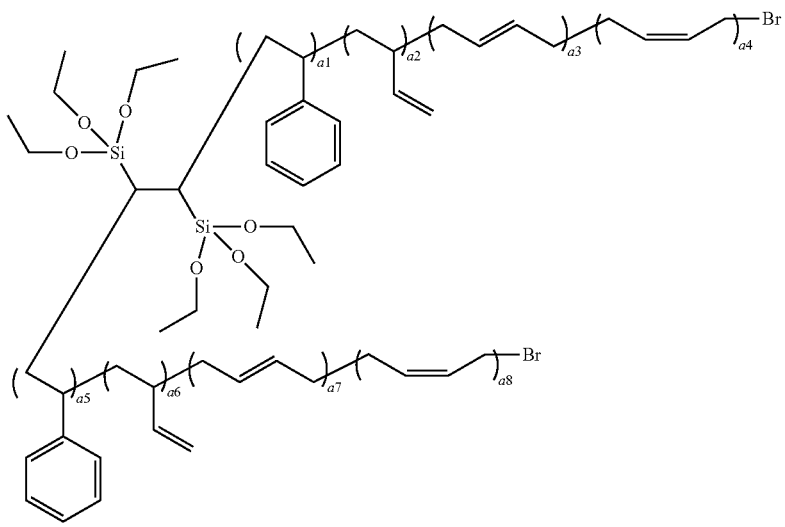

[Chemical Formula 1b]

In addition, the present invention addresses a modifier, which is a compound represented by Chemical Formula 1 below:

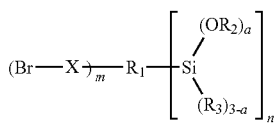

[Chemical Formula 1]

wherein $R_1$ is a C1-C20 alkylene group and may be substituted with an amine group or an ether group, and $R_2$ and $R_3$ are a C1-C10 alkyl group, an amine group or an acryl group; X is a single bond or $P_1$, and $P_1$ is a conjugated diene-based polymer or an acrylic or nitrile compound, with a molecular weight of 10 to 100,000 g/mol; and a is 0, 1, 2, or 3, m is 2 or 3, and n is an integer of 1 to 3.

The compound represented by Chemical Formula 1 may be, for example, the compound represented by Chemical Formula 1a below.

wherein a1 to a8, which are identical to or different from each other, range from 0 to 200.

In addition, the present invention addresses a modified conjugated diene-based polymer rubber composition, comprising 10 to 100 parts by weight of the modified conjugated diene-based polymer and 0.1 to 200 parts by weight of an inorganic filler based on 100 parts by weight of the modified conjugated diene-based polymer.

The amount of the inorganic filler may be 10 to 150 parts by weight, or 50 to 100 parts by weight.

The inorganic filler may include carbon black, a silica-based filler or a mixture thereof.

The inorganic filler may be silica. As such, dispersibility is significantly increased, and the end of the modified conjugated diene-based polymer of the invention may be coupled (sealed) with silica particles, thus significantly decreasing hysteresis loss.

The modified conjugated diene-based polymer rubber composition may further comprise an additional conjugated diene-based polymer.

The additional conjugated diene-based polymer may include SBR (styrene-butadiene rubber), BR (butadiene rubber), natural rubber, or mixtures thereof.

SBR may be exemplified by SSBR (solution styrene-butadiene rubber).

The modified conjugated diene-based polymer rubber composition according to the present invention may comprise 20 to 100 parts by weight of the modified conjugated diene-based polymer and 0 to 80 parts by weight of the additional conjugated diene-based polymer.

Alternatively, the modified conjugated diene-based polymer rubber composition according to the present invention may comprise 20 to 99 parts by weight of the modified conjugated diene-based polymer and 1 to 80 parts by weight of the additional conjugated diene-based polymer.

Alternatively, the modified conjugated diene-based polymer rubber composition according to the present invention may comprise 10 to 100 parts by weight of the modified conjugated diene-based polymer, 0 to 90 parts by weight of the additional conjugated diene-based polymer, 0 to 100 parts by weight of carbon black, 5 to 200 parts by weight of silica, and 2 to 20 parts by weight of a silane coupling agent.

Alternatively, the modified conjugated diene-based polymer rubber composition according to the present invention may comprise 10 to 100 parts by weight of the modified conjugated diene-based polymer, 0 to 90 parts by weight of the additional conjugated diene-based polymer, 0 to 100 parts by weight of carbon black, 5 to 200 parts by weight of silica, and 2 to 20 parts by weight of a silane coupling agent, in which the total weight of the modified conjugated diene-based polymer and the additional conjugated diene-based polymer may be 100 parts by weight.

Alternatively, the modified conjugated diene-based polymer rubber composition according to the present invention may comprise 100 parts by weight of a polymer mixture comprising 10 to 99 wt % of the modified conjugated diene-based polymer and 1 to 90 wt % of the additional conjugated diene-based polymer, 1 to 100 parts by weight of carbon black, 5 to 200 parts by weight of silica, and 2 to 20 parts by weight of a silane coupling agent.

In addition, the modified conjugated diene-based polymer rubber composition may further comprise 1 to 100 parts by weight of oil.

The oil may be exemplified by mineral oil or a softener.

The oil may be used in an amount of, for example, 10 to 100 parts by weight, or 20 to 80 parts by weight, based on 100 parts by weight of the conjugated diene-based polymer. Given the above oil amount range, desired properties may be exhibited, and the rubber composition may be appropriately softened, thus increasing processability.

The modified conjugated diene-based polymer rubber composition may be used to manufacture, for example, a tire or a tire tread.

According to the present invention, the tire or tire tread is manufactured using the modified conjugated diene-based polymer rubber composition.

MODE FOR INVENTION

A better understanding of the present invention may be obtained via the following examples, which are merely set forth to illustrate the present invention, and those skilled in the art will appreciate that various changes and modifications are possible, without departing from the scope and spirit of the invention as disclosed in the accompanying claims.

EXAMPLE 1

A continuous reactor comprising 10 L, 10 L and 20 L autoclave reactors connected in series was prepared. 60% of a styrene solution at 421 g/h, 60% of a 1,3-butadiene solution at 1200 g/h, n-hexane at 3800 g/h, 3% of a 2,2-bis (2-tetrahydrofurfuryl)propane solution as a polar additive at 84 g/h, and 1% of an n-butyllithium solution as an initiator at 60 g/h were fed into the first reactor of the continuous reactor. The temperature of the first reactor was maintained at 65° C., and the retention time was set to 20 min.

The polymer was transferred from the first reactor into the second reactor using a gear pump, and 60% of a 1,3-butadiene solution was additionally fed at a rate of 60 g/h. The temperature of the second reactor was maintained at 75° C., and the retention time was set to 30 min. The polymer was transferred from the second reactor into the third reactor using a gear pump, and 10% of a 1,2-bis(triethoxysilyl)-1, 2-dibromoethane solution was fed at a rate of 17 g/h. The temperature of the third reactor was maintained at 75° C., and the retention time was set to 30 min.

The polymer solution output from the third reactor was added with a Wingstay solution as a polymerization stopper to stop the polymerization reaction, and TDAE oil was added in an amount of 25 phr and stirred.

The resulting polymer was added to water warmed with steam, stirred to remove the solvent, and then roll dried to remove the remaining solvent and water, yielding a modified conjugated diene-based polymer.

EXAMPLE 2

A continuous reactor comprising 10 L, 10 L and 20 L autoclave reactors connected in series was prepared. 60% of a styrene solution at 421 g/h, 60% of a 1,3-butadiene solution at 1200 g/h, n-hexane at 3800 g/h, 3% of a 2,2-bis (2-tetrahydrofurfuryl)propane solution as a polar additive at 84 g/h, and 1% of an n-butyllithium solution as an initiator at 60 g/h were fed into the first reactor of the continuous reactor. The temperature of the first reactor was maintained at 65° C., and the retention time was set to 20 min.

The polymer was transferred from the first reactor into the second reactor using a gear pump, and 60% of a 1,3-butadiene solution was additionally fed at a rate of 60 g/h. The temperature of the second reactor was maintained at 75° C., and the retention time was set to 30 min. The polymer was transferred from the second reactor into the third reactor using a gear pump, and 10% of a 1,2-bis(triethoxysilyl)-1, 2-di(bromo-polystyrene-butadiene)ethane solution was fed at a rate of 200 g/h. The temperature of the third reactor was maintained at 75° C., and the retention time was set to 30 min.

The polymer solution output from the third reactor was added with a Wing stay solution as a polymerization stopper to stop the polymerization reaction, and TDAE oil was added in an amount of 25 phr and stirred.

The resulting polymer was added to water warmed with steam, stirred to remove the solvent, and then roll dried to remove the remaining solvent and water, yielding a modified conjugated diene-based polymer. The results of analysis of the modified conjugated diene-based polymers thus obtained are shown in Table 1 below.

COMPARATIVE EXAMPLE 1

The results of analysis of a non-modified conjugated diene-based polymer, 2550H, made by LG Chemical, are shown in Table 1 below.

The conjugated diene-based polymers of Examples 1 and 2 and Comparative Example 1 were analyzed through the following methods.

a) Mooney viscosity: two samples having a weight of 15 g or more were preheated for 1 min and then measured at 100° C. for 4 min using an MV-2000, made by ALPHA Technologies.

b) Styrene monomer (SM) and Vinyl content: measurement was conducted using NMR.

c) Weight average molecular weight (Mw), Number average molecular weight (Mn), and Polydispersity Index (PDI): measurement was conducted via GPC at 40° C. The column herein used was a combination of two PLgel Olexis columns and one PLgel mixed-C column, made by Polymer Laboratories, and all of the replaced columns were mixed bed-type columns. Also, polystyrene (PS) was the GPC standard material for the calculation of molecular weight.

TABLE 1

| | | Ex. | | C. Ex. |
|---|---|---|---|---|
| | | 1 | 2 | 1 |
| Sample | | A | B | C |
| Coupling agent | a | 4.0 | — | — |
| | b | — | 4.0 | — |
| TDAE oil | phr | 25.2 | 25.0 | 37.5 |
| Mooney viscosity (MV) | | 50.1 | 52.4 | 48.6 |
| NMR (%) | SM | 25.7 | 24.8 | 25.2 |
| | Vinyl | 50.1 | 51.1 | 51.3 |
| GPC (×10$^4$) | Mn | 35.6 | 37.2 | 41.4 |
| | Mw | 67.7 | 69.3 | 102.8 |
| | PDI | 1.90 | 1.89 | 2.48 | a: 1,2-bis(triethoxysilyl)-1,2-di(bromo)ethane
b: 1,2-bis(triethoxysilyl)-1,2-di(bromo-polystyrene-butadiene)ethane PREPARATION EXAMPLES 1 AND 2 AND COMPARATIVE PREPARATION EXAMPLE 1: PREPARATION OF RUBBER COMPOSITION The conjugated diene-based polymer rubber compositions of Preparation Examples 1 and 2 and Comparative Preparation Example 1 were prepared using samples A, B, and C shown in Table 1, as raw rubber, under the mixing conditions shown in Table 2 below.

TABLE 2

| (unit: parts by weight) | S-1 |
|---|---|
| Rubber | 100.0 |
| Silica | 70.0 |
| Coupling agent | 11.02 |
| Oil | 33.75 |
| Zinc oxide | 3.0 |
| Stearic acid | 2.0 |
| Antioxidant | 2.0 |
| Anti-aging agent | 2.0 |
| Wax | 1.0 |
| Rubber accelerator | 1.75 |
| Sulfur | 1.5 |
| Vulcanization accelerator | 2.0 |
| Total weight | 230.02 |

The conjugated diene-based polymer rubber composition was kneaded as follows. Specifically, upon primary kneading, raw rubber (conjugated diene-based polymer), a filler, an organosilane coupling agent, oil, zinc oxide, a stearic acid antioxidant, an anti-aging agent, wax and an accelerator were kneaded at 80 rpm using a Banbury mixer provided with a temperature controller. For this, the temperature of the kneader was controlled, and a first mixture was obtained at a discharge temperature of 140 to 150° C. Upon secondary kneading, the first mixture was cooled to room temperature, after which rubber, sulfur and a vulcanization accelerator were placed in the kneader, thus obtaining a second mixture at a discharge temperature of 45 to 60° C. Upon third kneading, the second mixture was molded and vulcanized at 180° C. for T90+10 min using a vulcanization press, thereby manufacturing vulcanized rubber.

The properties of the manufactured vulcanized rubber were measured through the following methods.

1) Tensile Testing

According to the tensile testing method of ASTM 412, the tensile strength upon cutting a test sample and tensile stress (300% modulus) at 300% elongation were measured. The tensile properties of the vulcanized rubber were measured using a Universal Test Machine 4204, made by Instron, and the tensile strength, modulus, and elongation were measured at a tensile speed of 50 cm/min at room temperature.

2) Viscoelasticity

A dynamic mechanical analyzer made by TA was used. When undergoing deformation under conditions of a frequency of 10 Hz in a distortion mode and a measurement temperature ranging from 0 to 60° C., the Tan δ of each sample was measured. The Payne effect was represented by the difference between the minimum and the maximum in the deformation range of 0.2 to 40%. The lower the Payne effect, the higher the dispersibility of the filler such as silica. When Tan δ at 0° C., which is a low temperature, was increased, wet skid resistance became superior, and when Tan δ at 60° C., which is a high temperature, was decreased, hysteresis loss was reduced, resulting in low rolling resistance of tires, and thus improved fuel economy. Table 3 below shows the properties of the vulcanized rubber.

3) Rolling Resistance (RR) and Wet Grip

The rolling resistance (RR) and wet grip of rubber were measured using DMTS (Dynamic mechanical thermal spectrometry; GABO, EPLEXOR 500N). The measurement conditions were as follows: frequency: 10 Hz, strain (static strain: 3%, dynamic strain: 0.25%), and temperature: −60 to 70° C. As such, RR was determined from Tan δ measured at 60° C., and wet grip was determined from Tan δ measured at 0° C. These values were represented as indexes relative to the value of Comparative Example 1, which was set to 100.

TABLE 3

| Sample | Prep. Ex. 1 A | Prep. Ex. 2 B | C. Prep. Ex. 1 C |
|---|---|---|---|
| 300% Modulus (Kgf/cm$^2$) | 112 | 111 | 100 |
| Tensile strength (Kgf/cm$^2$) | 102 | 101 | 100 |
| Tanδ at 0° C. | 116 | 113 | 100 |
| Tanδ at 60° C. | 118 | 114 | 100 |

As is apparent from the results of Table 3, compared to Comparative Preparation Example 1, the modified conjugated diene-based polymer rubber compositions of Preparation Examples 1 and 2 according to the present invention were increased by about 10% in 300% modulus (tensile stress) and exhibited equal or higher tensile strength. Also, in the conjugated diene-based polymer rubber compositions of Preparation Examples 1 and 2 according to the present invention, in comparison with Comparative Preparation Example 1, Tan δ at 0° C. was improved by at least 10% and Tan δ at 60° C. was improved by 15%. Thus, when the modified conjugated diene-based polymer of the invention was used for a tire, high wet skid resistance and low rolling resistance resulted.

The invention claimed is:

1. A modified conjugated diene-based polymer represented by Chemical Formula 2a or Chemical Formula 2b below:

[Chemical Formula 2a]

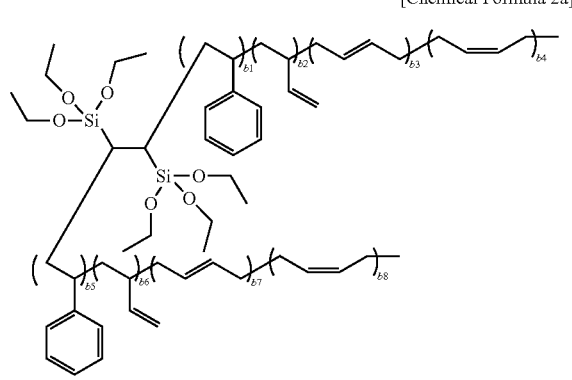

[Chemical Formula 2b]

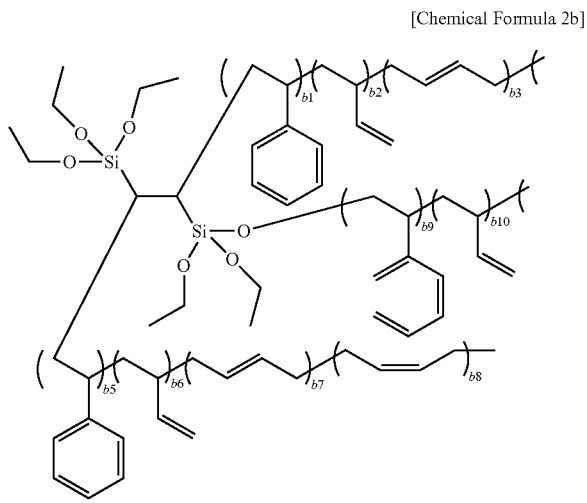

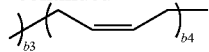

wherein b1 to b12, which are identical to or different from each other, range from 10 to 20,000.

2. A modified conjugated diene-based polymer rubber composition, comprising 10 to 100 parts by weight of the modified conjugated diene-based polymer of claim 1 and 0.1 to 200 parts by weight of an inorganic filler based on 100 parts by weight of the modified conjugated diene-based polymer.

3. The modified conjugated diene-based polymer rubber composition of claim 2, wherein the inorganic filler comprises at least one of carbon black and a silica-based filler.

4. A tire or tire tread, comprising the modified conjugated diene-based polymer rubber composition of claim 2.

5. A method of preparing a modified conjugated diene-based polymer, comprising:
   a) polymerizing a conjugated diene monomer or a conjugated diene monomer and an aromatic vinyl monomer using a hydrocarbon solvent in presence of an organo-alkali metal compound, thus forming an active polymer having an alkali metal end; and
   b) coupling or linking the active polymer having the alkali metal end with a compound represented by Chemical Formula 1a or Chemical Formula 1b below:

[Chemical Formula 1a]

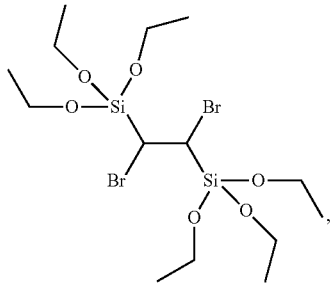

[Chemical Formula 1b]

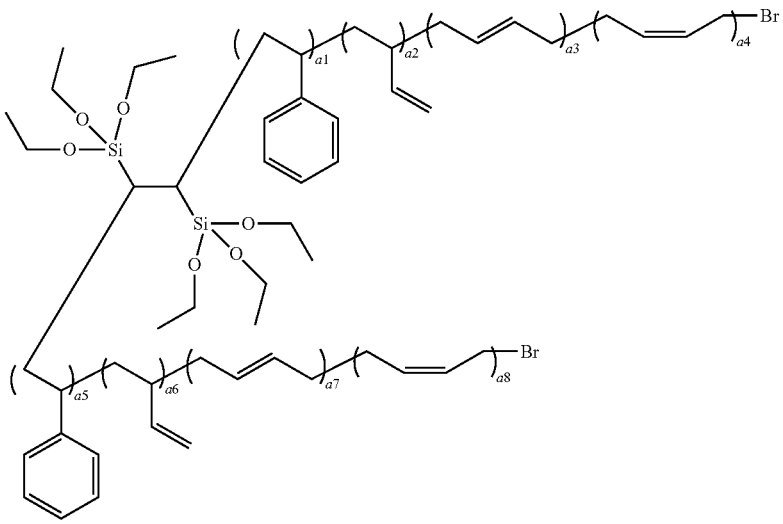

wherein a1 to a8, which are identical to or different from each other, range from 0 to 200

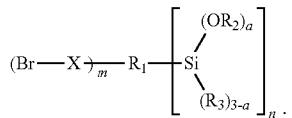

6. The method of claim 5, wherein the organo-alkali metal compound is used in an amount of 0.01 to 10 mmol based on 100 g in total of the conjugated diene monomer or 100 g in total of the conjugated diene monomer and an aromatic vinyl monomer.

7. The method of claim 5, wherein a molar ratio of the organo-alkali metal compound and the compound represented by Chemical Formula 1 is 1:0.1 to 1:10.

8. The method of claim 5, wherein the polymerizing in a) is performed with additional use of a polar additive.

9. The method of claim 8, wherein the polar additive is added in an amount of 0.001 to 50 g based on 1 mmol in total of the compound represented by Chemical Formula 1.

* * * * *